United States Patent [19]

Krenceski et al.

[11] Patent Number: 4,933,237
[45] Date of Patent: Jun. 12, 1990

[54] PAINT COATED SHEET MATERIAL WITH ADHESION PROMOTING COMPOSITION

[75] Inventors: Mary A. Krenceski, Rochester; John M. Pochan, Penfield, both of N.Y.

[73] Assignee: Eastman Kodak Company, Rochester, N.Y.

[21] Appl. No.: 313,198

[22] Filed: Feb. 17, 1989

[51] Int. Cl.$^5$ .............................................. B32B 27/40
[52] U.S. Cl. .............................. 428/423.7; 428/423.3; 428/480; 156/229
[58] Field of Search .................. 428/480, 423.7, 423.3; 156/229, 494

[56] References Cited

U.S. PATENT DOCUMENTS

| | | | |
|---|---|---|---|
| 3,531,314 | 9/1970 | Kerr et al. | 117/34 |
| 3,549,406 | 12/1970 | Ambusk | 117/34 |
| 4,160,065 | 7/1979 | Loewrigkeit et al. | 428/425 |
| 4,335,029 | 6/0982 | Dabi et al. | 524/589 |
| 4,447,571 | 5/1984 | Dabi et al. | 524/192 |
| 4,731,289 | 3/1988 | Coleman | 428/423.7 X |
| 4,745,301 | 5/1988 | Michalchik | 307/119 |
| 4,752,532 | 6/1988 | Starka | 428/423.7 X |
| 4,767,671 | 8/1988 | Parker et al. | 428/423.7 X |
| 4,769,100 | 9/1988 | Short et al. | 156/285 |

FOREIGN PATENT DOCUMENTS 266109 5/1988 European Pat. Off. .
285071 5/1988 European Pat. Off. .
230364 7/1989 European Pat. Off. .

OTHER PUBLICATIONS

Witobond W-240; Witco Corp., Apr. 1986, Organics Division.
Rubber World, p. 66, Jun. 1981.
Witcobond Aqueous Urethane Dispersion; 1986; Witco.
U.S. Ser. No. 116,426, Reafler (Assigned to Eastman Kodak Co.).
U.S. Ser. No. 237,129, Hayward et al. (Assigned Eastman Kodak Co.).

*Primary Examiner*—George F. Lesmes
*Assistant Examiner*—Christopher W. Brown
*Attorney, Agent, or Firm*—William J. Davis

[57] ABSTRACT

A protective and decorative, stretchable, thermoplastic sheet material for bonding by thermoforming to automobile body panels and other articles which comprises a polyester carrier film coated with an aqueous polyurethane paint composition. To aid in the adhesion of the paint, the carrier film is coated with a tie coat composition comprising a self-crosslinking, aqueous polyurethane dispersion.

11 Claims, 1 Drawing Sheet

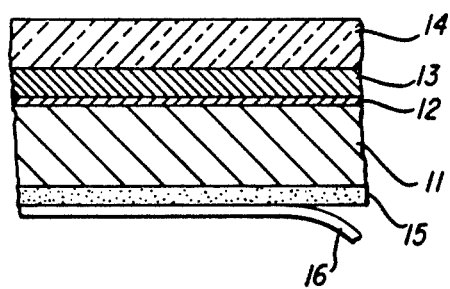

PAINT COATED SHEET MATERIAL WITH ADHESION PROMOTING COMPOSITION

FIELD OF THE INVENTION

This invention relates to a paint-coated sheet material and, more particularly, to such a sheet material which is coated with a composition for improving the adhesion of a paint layer to a stretchable, thermoplastic carrier film.

BACKGROUND

The patent application of G. Reafler, Ser. No. 116,426 filed Nov. 3, 1987 describes a new paint-coated, thermoformable sheet material of exceptional high quality. It is useful for applying protective and decorative surfaces to substrates such as automobile panels, household appliances and the like. The new paint-coated sheet materials afford savings in paints as compared with conventional spray painting processes. Moreover, air pollution from evaporating paint solvents can be reduced.

Through the use of laminar flow coating techniques as described in the Reafler patent application, sheet materials are formed which have outstanding surface properties such as gloss and distinctness of image. A preferred species of the new protective and decorative sheet material is formed by coating an aqueous polyurethane paint on a stretchable, thermoplastic polyester carrier film. To improve the adhesion of the aqueous polyurethane paint to the polyester carrier films, an adhesion promoting coating or, as it is also called, a tie layer, is coated on the carrier film before the paint is applied.

Although previous tie layers have improved adhesion, very strong adhesion is required of sheet materials to be used as exterior coverings for automotive panels and other articles. It is difficult to achieve strong adhesion of a water-based polyurethane paint composition to a stretchable, hydrophobic polyester carrier film even though a tie coat is used. The exposure of such materials to heat and humidity further aggravates the problem. Hence, a sheet material with improved adhesion of the aqueous polyurethane paint to the polyester carrier film has been needed.

SUMMARY OF THE INVENTION

The present invention provides a protective and decorative sheet material of the type described having improved adhesion of the aqueous polyurethane paint coating to the polyester carrier film. The improvement is achieved by using as a tie layer a particular polyurethane composition.

The sheet material of the invention is a protective and decorative sheet material for use in a thermoforming process in which it is stretched and bonded to a three dimensional substrate. It comprises a flexible and stretchable thermoplastic polyester carrier film, a stretchable aqueous polyurethane paint layer, a stretchable transparent polyurethane topcoat layer and, disposed between the carrier film and the paint layer, a thin tie layer formed by coating a self-crosslinking aqueous polyurethane anionic colloidal dispersion, the polyurethane being derived from a polyurethane prepolymer of which the chain is extended with an aliphatic polyamine chain extender and is end-capped with N-methylol hydrazide groups, the prepolymer being derived from an aliphatic diisocyanate, an aliphatic polyester polyol and having pendant water-dispersing carboxylic salt groups in the polymer chain.

THE DRAWING

The sole FIGURE of the drawing is an enlarged, diagrammatic cross section of a sheet material of the invention.

DETAILED DESCRIPTION

The sheet material of the invention is a flexible and stretchable sheet material of the class described in the Reafler patent application Ser. No. 116,426 of Nov. 3, 1987. This sheet material is a paint-coated film which is applied by thermoforming to the surfaces of automobile panels or other articles to serve as a protective and decorative covering. The term thermoforming is used herein to include the vacuum forming and bonding of a heated thermoplastic film to a metal, plastic or other substrate as well as the "in-mold" bonding of such a film to plastic parts in a mold.

The sheet material includes a flexible and stretchable carrier film and polymeric coatings such as paint layers and clear topcoats, which have heat softening and tensile elongation properties that are compatible with those of the carrier film so that the sheet material can be stretched without crazing or delaminating the coated layers.

The drawing is an enlarged, diagrammatic cross-section, not to scale, of a particular sheet material of the invention. It includes a flexible and stretchable thermoformable polyester carrier film 11. The carrier film has a substantially uniform thickness which can be in the range from about 0.05 to 0.40 millimeters. Preferably, the thickness is from about 0.16 to 0.32 millimeters. Coated on the carrier film is a thin tie layer 12, the composition of which will be described in detail hereinafter. Coated over the tie layer 12 is the basecoat or paint layer 13, the thickness of which can be in the range from about 0.012 to 0.08 millimeters. Over the paint coat 13 is a transparent crosslinked polyurethane topcoat 14 which normally is substantially thicker than the basecoat, e.g., having a thickness in the range from about 0.02 to 0.25 millimeters. Optionally, the back side of carrier film 11 is coated with an adhesive layer 15 to facilitate bonding of the sheet material to substrates. Preferably, this is a pressure-sensitive adhesive layer in which case a protective release sheet 16 of polyester film or the like is temporarily bonded to the adhesive layer to protect it prior to thermoforming. In the "in-mold" method of thermoforming an adhesive usually is not necessary because bonding is achieved by fusion of the carrier film to the molded plastic article.

The polyester carrier films used in the sheet materials of the present invention are formed by melt extruding thermoplastic immiscible blends of a relatively rigid, linear polyester and a more flexible copolymer. The term polyester carrier film as used herein is intended to include such blends.

A preferred linear polyester for such blends is a copolymer of terephthalic acid, 1,4-cyclohexanedimethanol and a lower alkylene glycol. The more flexible copolymer can be a polymer such as a rubber-modified, styrene-maleic anhydride copolymer or a poly(ether-ester) derived from 1,4-cyclohexanedicarboxylic acid.

A preferred carrier film composition is an immiscible blend of a copolyester based on poly(1,4-cyclohexylenedimethylene terephthalate) and a more flexible rubber-modified styrene-maleic anhydride copolymer, as described in the patent to Weemes et al, U.S. Pat. No. 4,582,876 dated Apr. 15, 1986. More particularly, the blend contains (a) 70 to 30 weight percent copolyester consisting of repeating units from terephthalic acid, repeating units from 1,4-cyclohexanedimethanol present in the amount of 25 to 90 mole % and repeating units from a second glycol having 2 to 6 carbon atoms present in the amount of 75 to 10 mol %, wherein the total mol % of glycol is equal to 100 mol %, and (b) 30 to 70 weight percent thermoplastic rubber-modified vinyl aromatic polymer composition comprising (1) from 60 to 93% by weight of a nonequimolar copolymer of 70 to 98% by weight based on a copolymer of a vinyl aromatic monomer and from 2 to 30% by weight based on a copolymer of an unsaturated dicarboxylic acid moiety copolymerizable therewith, and (2) from 7 to 40% by weight of at least two differing rubbery additives which were present during the copolymerization of the monomers of component (1), wherein the rubbery additives comprise from 5 to 20% by weight based on the total composition of at least one high vinyl aromatic conjugated diene copolymer wherein the at least one high conjugated diene-vinyl aromatic copolymer comprises from about 60 to about 98% by weight of the conjugated diene. At least one high vinyl aromatic conjugated diene copolymer preferably is a block copolymer which comprises a greater amount of vinyl aromatic than conjugated diene monomer. The composition can include fillers, UV absorbers, plasticizers, colorants, antioxidants, etc. known to be useful in polymeric films.

Another preferred composition for carrier films is described in the copending application of Seymour, Ser. No. 151,727 filed Feb. 3, 1988. This composition forms a very flexible carrier film which is especially useful for applying coverings to plastic articles by the "in-mold" process. The composition is an immiscible blend of a flexible poly(etherester) with a more rigid linear polyester of terephthalic acid. More specifically, the blends comprise (A) about 98-2 weight % of a flexible poly(etherester) having an I.V. of about 0.8-1.5 and recurring units from
  (1) a dicarboxylic acid component consisting essentially of 1,4-cyclohexanedicarboxylic acid having a trans isomer content of at least 70%,
  (2) a glycol component consisting essentially of
    (a) about 95 to about 65 mol % 1,4-cyclohexanedimethanol, and
    (b) about 5 to about 35 mol % poly(oxytetramethylene) glycol having a molecular weight of about 500 to about 1100, and
(B) about 2-98 weight % of a relatively rigid polyester having recurring units from about 80-100 mol % terephthalic acid and at least one aliphatic or cycloaliphatic glycol having 2-12 carbon atoms, said polyester having an I.V. of about 0.5-1.0.

The blends have greater stiffness than the poly(etherester) alone. They also have unexpectedly improved notched Izod impact strengths when compared to the poly(etherester) alone when the blends contain about 98-60 wt % of the flexible poly(estherester) and about 2-40 wt % of the relatively rigid polyester.

The dibasic acid component of the poly(etherester) consists essentially of 1,4-cyclohexanedicarboxylic acid having a trans isomer content of at least 70%, preferably at least 80% and most preferably at least 85% trans isomer content.

The poly(oxytetramethylene) glycol component has a molecular weight of between about 500 and about 1100, preferably about 1000 (weight average). It is used in an amount of from about 5 to about 35 mol %, preferably about 8–15%, based on the total glycol mol %.

The poly(etherester) further may comprise up to about 1.5 mol %, based on the acid or glycol component, of a polybasic acid or polyhydric alcohol branching agent having at least three COOH or OH functional groups and from 3 to 60 carbon atoms. Esters of many such acids or polyols may also be used. Suitable branching agents include trimellitic acid or anhydride, trimesic acid, trimethylol ethane and trimethylol propane.

It should be understood that in this polymer the total acid reactants should be 100 mol %, and the total glycol reactants should be 100 mol %. Although the acid reactant is said to "consist essentially of" 1,4-cyclohexanedicarboxylic acid, if the branching agent is a polybasic acid or anhydride, it will be calculated as part of the 100 mol % acid. Likewise, the glycol reactant is said to "consist essentially of" 1,4-cyclohexanedimethanol and poly(oxytetramethylene) glycol, if the branching agent is a polyol, it will be calculated as part of the 100 mol % glycol.

The poly(etherester) compositions preferably contain a hindered, non-volatile phenolic antioxidant in an amount of from about 0.1 to 1.0, based on the weight of copolyesterether.

The poly(etherester) can be prepared by conventional techniques using an acid component consisting essentially of terephthalic acid. Minor amounts of other conventionally used dicarboxylic acids (up to about 10%) such as isophthalic, naphthalene dicarboxylic or aliphatic dicarboxylic acids having about 4 to 12 carbon atoms may be used. A glycol, or a combination of glycols for copolymers, having 2 to 12 carbon atoms is used. The preferred glycols are ethylene glycol, 1,4-butanediol and 1,4-cyclohexanedimethanol, and combinations thereof. Especially preferred glycols are ethylene glycol and 1,4-cyclohexanedimethanol and combinations thereof. The I.V. of the polyester is about 0.5-1.0.

The flexible poly(etherester) and the more rigid polyester can be blended by conventional plastic melt-mixing methods such as melt blending using an extruder.

The following are examples of components of highly flexible polymer blends which are useful in forming carrier films. Polymer "X" is a poly(etherester) having an I.V. of 1.23 and recurring units from
99.5 mol % 1,4-cyclohexanedicarboxylic acid
(trans content about 90%)
0.5 mol % trimellitic anhydride
91.1 mol % 1,4-cyclohexanedimethanol
8.9 mol % poly(oxytetramethylene) glycol
having a molecular weight of 1000
Polymer "Y" is an amorphous, linear polyester having an I.V. of 0.75 and recurring units from
100 mol % terephthalic acid
68 mol % 1,4-cyclohexanedimethanol
32 mol % ethylene glycol
Polymer "Z" is an amorphous, linear polyester having an I.V. of 0.75 and recurring units from
100 mol % terephthalic acid
69 mol % ethylene glycol
31 mol % 1,4-cyclohexanedimethanol In forming specific carrier film blends, polymer X can be melt blended with polymer Y or polymer Z in various ratios to provide a carrier film blend having the desired physical properties.

The present invention is based on the discovery that a certain aqueous polyurethane composition is especially effective as a tie coat for improving the adhesion of aqueous polyurethane paint compositions to polyester carrier films of the types discussed above. The paint compositions are water-based polyurethane paints which are designed as automotive finishes and which have heat softening and tensile elongation properties that are compatible with those of the stretchable carrier film.

Aqueous polyurethane paint compositions having the desired properties contain polyurethanes which can be prepared by reacting an organic polyisocyanate with an active hydrogen-containing compound such as a polyol or a polyamine or a mixture thereof to form a polyurethane, a polyurea or a mixed poly(urethane-urea). With regard to the paint composition, the term polyurethane is used broadly herein to mean any of such polymers.

The organic polyisocyanate of the paint composition can be an aliphatic or an aromatic polyisocyanate or a mixture of the two. Diisocyanates are preferred, although higher polyisocyanates can be used in place of or in combination with diisocyanates.

Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis(cyclohexylisocyanate). Examples of suitable higher polyisocyanates are 1,2,4-benzene triisocyanate and polymethylene polyphenyl isocyanate.

Water-based polyurethane basecoats in color-plus-clear compositions are disclosed in U.S. Pat. No. 4,719,132. The polyurethane basecoat compositions described in the patent can be used in the practice of the present invention. Other examples of useful water-based polyurethanes are disclosed in U.S. Pat. No. 4,149,679.

The aqueous polyurethane paint compositions can contain various additives, especially colorants. These include inorganic pigments such as titanium dioxide, iron oxide, chromium oxide, lead chromate, carbon black, silica, talc, china clay, metallic oxides, silicates, chromates, etc., and organic pigments, such as phthalocyanine blue, phthalocyanine green, carbazole violet, anthrapyrimidine yellow, flavanthrone yellow, isoindoline yellow, indanthrone blue, quinacridone violet, perylene reds, diazo red and others known to those skilled in the art.

The paints can also contain reflective particles in addition to a colorant and binder. Any particles conventionally employed in paints, particularly those employed in automotive finish paints can be used. Suitable reflective particles include metallic flakes such as aluminum flake, copper flake, bronze flake, copper bronze flake, nickel flake, zinc flake, magnesium flake, silver flake, gold flake, platinum flake and other platelets such as mica, glass, stainless steel, coated mica, coated glass, and aluminum coated polyester film fragments. Mixtures of two or more types of particles can be used. It is believed that paints containing a substantial concentration of such pigments and reflective particles present even greater adhesion problems on polyester carrier films. The tie layers of the present invention contribute to the successful adhesion of such paint compositions.

The paint layer preferably has a mean thickness in the range of from about 0.012 to 0.080 millimeters. A particularly preferred mean thickness is in the range of from about 0.020 to 0.060 millimeters.

Examples of useful aqueous polyurethane paint compositions are listed in Tables I, II and III.

TABLE I

| Ingredient | Approximate % Weight |
| --- | --- |
| Deionized Water | 50 |
| Urethane Resin | 25 |
| Aluminum Paste | 5 |
| Ethylene Glycol Monohexyl Ether | 5 |
| N-Methylpyrrolidinone | 5 |
| Diethylene Glycol Monobutyl Ether | 1 |
| N,N-Dimethyl Ethanolamine | 1 |
| Xylene | 1 |
| Aliphatic Solvent Naptha | 1 |
| Isopropyl Alcohol | <1 |

TABLE II

| Ingredient | Approximate % Weight |
| --- | --- |
| Deionized water | 55 |
| Urethane resin | 20 |
| Ethylene Glycol Monohexyl Ether | 5 |
| N-Methylpyrrolidinone | 5 |
| Diethylene Glycol Monobutyl Ether | 1 |
| N,N-Dimethyl ethanolamine | 1 |
| Titanium Dioxide/Mica | <1 |
| Silica | <1 |
| Carbon Black | <1 |
| Isopropyl Alcohol | <1 |

TABLE III

| Ingredient | Approximate % Weight |
| --- | --- |
| Titanium Dioxide | 25 |
| Ethylene Glycol Monohexyl ether | 5 |
| Diethylene Glycol Monobutyl Ether | 1 |
| Deionized Water | 45 |
| N,N-Dimethyl Ethanolamine | 1 |
| N-Methylpyrrolidinone | 5 |
| Urethane Resin | 20 |

Applicants have discovered that the adhesion of an aqueous polyurethane paint composition and a polyester carrier film of the types described can be markedly improved by using as a tie coat a self-crosslinking, aqueous polyurethane dispersion which is curable at room temperature. Dispersions of this kind are described in detail in the patent to Dabi et al, U.S. Pat. No. 4,335,029 issued Jun. 15, 1982 which is incorporated by reference herein.

According to the Dabi et al patent, the self-crosslinking polyurethane is derived from an NCO-containing prepolymer. To make the polyurethane, the prepolymer is chain extended with an aliphatic polyamine chain extender such as an alkylene diamine or triamine. Preferably, the chain extender is a triamine-containing polyamine such as a mixture of a lower alkylene diamine and a lower alkylene triamine. Especially preferred is a mixture of ethylene diamine and diethylene triamine. After chain extension, a dihydrazide end-capper such as adipic dihydrazide is added to the dispersion. The resulting hydrazide end-capped prepolymer is then partially or completely N-methylolated with formaldehyde. The polyurethane is thus provided with internal crosslinking, curable hardening groups activated to self-condensation and crosslinking upon drying of the latex film on a substrate at room temperature.

The prepolymer for the polyurethane is a derivative of a polyester polyol prepared from aliphatic diols and an aliphatic dicarboxylic acid. The preferred prepolymer is derived from neopentyl glycol, hexanediol and adipic acid. The prepolymer is NCO-terminated and contains units in the chain derived from melamine and pendant water-dispersing carboxylic salt groups. To synthesize the prepolymer, the polyester polyol is reacted with melamine and an aliphatic diisocyanate such as 4,4'-bis(isocyanatocyclohexyl) methane. Carboxylic salt groups are inserted in the chain by reaction with an alpha, alpha-dimethylol $C_{2-10}$ alkanoic acid such as 2,2-dimethylol propionic acid followed by neutralization with a salt forming agent such as a tertiary amine, e.g., triethylamine. Through the use of appropriate diluents and agitation during preparation of the polyurethane, as described in the Dabi et al patent, a latex dispersion is obtained. This can be further diluted with water or solvents to obtain the optimum viscosity for coating the tie coat composition on the carrier by laminar flow coating.

A specific and preferred example, which applicants believe from their own analysis and from the disclosure of Dabi et al to be such a self crosslinking dispersion, is "Witcobond W-240" dispersion, a product of Witco Corporation of Houston, Tex. 77245. Typical properties of Witcobond W-240 dispersion are listed in Table IV.

TABLE IV

| Appearance | Translucent |
| --- | --- |
| Solids, % | 30 |
| Particle Charge | Anionic |
| Particle Size | Colloidal |
| pH at 25° C. | 8.5 |
| Viscosity at 25° C. (77° F.) Brookfield LVF, cps | <75 |
| Flash Point, Tag Closed Cup, °C. | >100 |
| Fugitive Organic Volatiles, weight % | 13.4 |
| Surface Tension, dynes/cm | 54 |
| Density, lb/gal | 8.724 |
| Specific Gravity at 25° C. | 1.05 |
| Glass Transition Temperature (Tg), °C. | −53 |
| Shear Stability | Excellent |
| Freeze-Thaw Stability (−18° C.) | Excellent after 6 cycles |
| Tensile Strength at Yield, psi | 6000 |
| Ultimate Elongation, % | 70 |
| Hydrolytic Stability | Excellent |

The sheet material of the invention also includes a transparent crosslinked polyurethane topcoat. For some uses of thermoformable paint coated sheet material, a transparent topcoat or clearcoat is optional. For other uses, as for high quality automobile finishes, a clearcoat is either necessary or at least highly preferred. It can provide improved smoothness, high gloss, hardness, durability, resistance to weathering and abrasion and scratch resistance. It provides the benefits of a basecoat/clearcoat system as now widely used in automobile finishes.

In addition, the applicants have found that when a self-crosslinking tie layer as described herein is used, the coating of a crosslinked polyurethane topcoat over the dried aqueous polyurethane paint layer further improves the adhesion of the paint layer to the tie-coated carrier film. Accordingly, the sheet materials of the invention have a crosslinked polyurethane transparent topcoat. This topcoat can be colorless, in which case it can be called a clearcoat, or it can be lightly pigmented.

The crosslinkable polyurethane topcoat compositions used in making applicants' sheet material are known in the art. They are transparent and comprise (a) as one component, a crosslinkable polymer such as a polyester polyol, a polyurethane polyol or an acrylic polyol and (b) as a second component a polyisocyanate crosslinking agent. Each component is dissolved in a volatile organic solvent such as acetone or toluene. The components are mixed just before the topcoat is coated over the paint layer.

The dry thickness of the topcoat preferably is somewhat greater than that of the basecoat. It usually is in the range from about 0.02 to 0.2 mm and preferably from about 0.03 to 0.1 mm. In view of its thickness, the topcoat can, if desired, be coated in two or more passes through the coating process in order to provide layers that are thin enough for the most effective drying.

The sheet materials of the invention can be made with a wide range of reactive, crosslinkable polyurethane topcoat compositions that are prepared for coating by mixing two or more reactive components before coating the mixture on a substrate. Examples of such compositions include crosslinking polyurethane film-forming compositions which are formed by the reaction of a crosslinkable urethane polymer with a crosslinking agent. One such composition is the solvent-based system comprising a polyurethane polyol as one component and a polyisocyanate as the other as disclosed in the patent to Porter, U.S. Pat. No. 4,719,132. Especially preferred is a two-component composition disclosed in this patent of which one component comprises a crosslinkable poly(ester-urethane) polyol and the other comprises a polyisocyanate crosslinking agent such as a polyfunctional aliphatic isocyanurate of 1,6-hexamethylene diisocyanate.

A specific example of a preferred clearcoat composition is as follows:

TABLE V

| | Ingredient | Approximate % Weight |
| --- | --- | --- |
| A | Urethane Resin | 60 |
| | Toluene | 30 |
| | 2-Butoxy Ethyl Acetate | 10 |
| | Benzotriazole | 1 |
| B* | Polyfunctional aliphatic isocyanurate resin based on 1,6-hexamethylene diisocyanate | 100 |

*Available as Desmodur N-3300 from Mobay Corporation Coatings Division.

The liquid tie coat, paint and topcoat compositions are coated successively on the carrier film, each coating being dried before any subsequent coating is applied. The coating procedure employed is a laminar flow procedure as described in the Reafler patent application Ser. No. 116,426. This includes direct extrusion onto the carrier film by use of an extrusion hopper functioning to apply the coating composition by bead coating or a stretch-flow coating mechanism. Another kind of laminar flow coating process involves extrusion of the coating composition through a slot with subsequent travel down the slide surface of a slide hopper or subsequent free fall in a curtain coating process. Also included are curtain coating processes in which the curtain is generated by the use of an overflow weir. These coating processes can provide a defect-free coating with a high degree of uniformity of layer thickness.

Extrusion hoppers are particularly effective devices for coating the paint and tie coat compositions. Especially advantageous is the fact that such high precision equipment can coat very thin layers as is desirable with tie layers. Such coating devices are also well-adapted for use with compositions which exhibit the shear-thinning characteristics typical of the described paint compositions. In such hoppers, transverse pressure gradients are minimized and almost all pressure drop across the slot is in the direction of coating.

Coating techniques and apparatus for making sheet materials of the present invention are used in the manufacture of photographic products and are described in U.S. Pat. Nos. 2,681,294, 2,761,791, 2,975,754, 3,206,323, 3,632,374, and 4,051,278.

After being coated onto the support, the coated layers are converted to a dry and tack-free state by drying, for example by conventional techniques or by the method of the application of Fronheiser et al Ser. No. 166,083 filed Mar. 9, 1988, now U.S. Pat. No. 4,872,270 issued Oct. 10, 1989, at temperatures of 25 to 100 degrees C.

The tie layer preferably has a dry thickness less than about 0.0025 mm and most preferably less than about 0.001 mm. The thickness preferably is much less than the thickness of the paint layer. For example, the paint layer preferably has a thickness at least 8 times the thickness of the adhesion-promoting tie layer.

Such thin tie coats, when coated by laminar flow, are susceptible to non-uniformities such as craters and pinholes, which are also referred to as repellencies. These are spots or areas on the coated film surface which are significantly reduced in thickness or completely void of coating material. They are usually circular in shape. To eliminate or reduce the number of such craters and pinholes when very thin coats are applied by laminar flow coating, it is desirable to include a surfactant in the tie coat composition. Especially desirable is the use of a non-ionic fluorinated surfactant of the formula

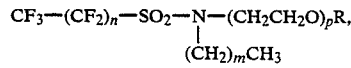

wherein R=H or lower alkyl, m=1 to 4, n=5 to 9 and p=2 to 30, as disclosed in the commonly-assigned copending application of applicants' co-workers Hayward et al, Ser. No. 237,129 filed Aug. 29, 1988. The preferred surfactant of this class is "FLUORAD FC 170C" surfactant supplied by 3M Company.

Although good adhesion is obtained in the sheet materials of the invention with or without a surfactant, the use of an appropriate surfactant, especially one of the class described, reduces any tendency of the tie coat composition to form craters and pinholes at low coating coverages. Thus, in a test disclosed in the copending application Ser. No. 237,129, the use of "Witcobond W-240" composition as a tie coat without an added surfactant resulted in irregular patterns or defects caused by coating inconsistencies. Although such defects are acceptable for some purposes, the preferred products of the invention are substantially free of them, as illustrated in Example 3 of the cited application.

The tie coat dispersion can also include minor amounts of other addenda such as solvents, e.g., N-methylpyrrolidinone, diethylene glycol monobutyl ether, ethylene glycol monohexyl ether, butyl acetate and propylene glycol; thickeners such as polyacrylics and cellulosics; polymer modifiers such as acrylic latices; defoamers and crosslinkers. The polymer components and addenda are dispersed in water to yield a dispersion which contains from about 60 to 95 weight percent water, preferably 70 to 90 weight percent water. The tie layer composition can contain from about 0.001 to 0.50 weight percent of the non-ionic surfactant, preferably 0.01 to 0.30 weight percent. The solids content of the dispersion is in the range from about 5 to about 40 weight percent.

The applicants' earliest work with the tie layer compositions described herein indicated that the adhesion of the various layers of the sheet material having a basecoat and a clearcoat over the tie coat was improved by subjecting the carrier film to corona discharge treatment before coating the tie coat and the aqueous polyurethane paint composition on it. Later results, however, tend to show that the adhesion improvement is about equal when using the described tie layer, whether or not the layer is corona discharge treated. In any event, corona discharge can be used if desired and in some cases, may further improve adhesion. Corona supplied by AC or DC current or a combination of AC superimposed on DC can be used. However, AC corona is preferred since a continuous wave AC corona requires less power. The corona discharge treatment of films is well known, being described, for example, in the patents to Kerr et al U.S. Pat. Nos. 3,531,314 and Ambusk 3,549,406 and further description of such treatments is believed unnecessary.

Although the sheet material of the present invention preferably is formed by laminar flow coating methods, improvement in adhesion of an aqueous polyurethane color coat to a polyester carrier film by using the tie coat composition described herein, can be achieved even with less desirable coating methods. Other such coating methods that have been proposed for paint coated films include spraying and reverse roll coating as described by, for example, the patent to Short et al, U.S. Pat. No. 4,769,100 (General Motors), European Patent Application No. 285,071 A2, published Oct. 5, 1988 (Avery International Corp.); European Patent Application No. 266,109 A2 published May 4, 1988 (Rexham Corp.); and European Patent Application No. 230,364 published Jul. 29, 1987 (3M Company).

The examples which follow provide further understanding of the invention. The control examples describe unsuccessful attempts to adhere aqueous polyurethane paints to a polyester carrier film while the invention examples illustrate preferred embodiments of the invention.

EXAMPLE 1

A stretchable polyester carrier film made by extruding a blend of a linear polyester and a rubbery copolymer as described in the patent to Weemes et al, U.S. Pat. No. 4,582,876 was coated by means of an extrusion hopper of the type disclosed in the patent to Beguin, U.S. Pat. No. 2,681,294 with a thin layer of Witcobond W-240 aqueous polyurethane dispersion to serve as a tie layer at a dry coverage of 0.54 g/sq m. After drying, the thickness of the tie layer was approximately 0.0005 mm. The dispersion contained 0.05 weight percent "Fluorad FC 170C" surfactant. Over the dried tie layer was then coated at a dry coverage of 43 g/sq m an aqueous polyurethane paint layer of the composition listed in Table I. The paint layer was dried to a thickness of about 0.038 mm. The paint coated film was thereafter coated with a two-component polyurethane clearcoat of the compositions listed in Table V and dried. Then a second clearcoat layer of the same composition and thickness was applied. After drying, the total clearcoat thickness was approximately 0.062 mm. The resulting sheet material having a basecoat, tie coat and clearcoat was conditioned at 38° C. and 100 percent RH (relative humidity) for more than four weeks and was then subjected to adhesion tests.

EXAMPLE 2

The procedure of Example 1 was repeated except that before coating the Witcobond W-240 tie coat composition on the polyester carrier film, the film was corona discharge treated. The treatment consisted of exposing the film to a 10 KHz, 10 Kv AC corona at a film speed of about 15m per minute for an exposure of about 8800 joules per m$^2$.

COMPARATIVE EXAMPLES

A and B:
The procedures of Examples 1 and 2, respectively, were repeated except that no tie coat was applied to the carrier film.

C to F:
The procedures of Examples 1 and 2 were repeated with a series of different tie coat compositions, as indicated in Table VI below.

The film samples of the invention and of the comparative examples were subjected to peel testing. The results are listed in Table VI. As the table shows, the paint layers of certain samples were tested before the clearcoat was applied. Other samples were tested after application of the clearcoat.

Also as indicated in the table, clearcoated samples were tested with and without heat and humidity conditioning treatment. The latter consisted of maintaining the sample at 38° C. and 100% RH for more than four (4) weeks. The peel testing was done according to modification of ASTM test D-903, the samples being 15 mm wide. The peel angle was 180 degrees. Results are reported as the average and one standard deviation from the mean.

TABLE VI

| | | | Peel Strength g/in width | | |
|---|---|---|---|---|---|
| Example | Tie Coat | CDT | Fresh Paint Only | Fresh Paint Plus Clear | Conditioned Paint/Clear |
| 1 | W-240 | No | 635 ± 39 | | >3000 |
| 2 | W-240 | Yes | 745 ± 33 | 2048 ± 46 | >3000 |
| Comparative A | None | No | 256 ± 41 | 2136 ± 92 | 930 ± 194 |
| B | None | Yes | 302 ± 29 | 1892 ± 368 | 1125 ± 133 |
| C | PWSA 1000 | No | 874 ± 9 | 1912 ± 30 | 97 ± 7 |
| D | PWSA 1000 | Yes | 918 ± 17 | 1905 ± 37 | 86 ± 20 |
| E | W-260 | Yes | 94 ± 3 | 1810 ± 316 | 29 ± 10 |
| F | Sancure 878 | Yes | 563 ± 32 | 1810 ± 47 | 3 ± 0.5 |

In the above table:

"W-240" means "Witcobond W-240" self-crosslinking aqueous polyurethane dispersion as used in the sheet materials of the invention.

"PWSA 1000" is an acrylic urethane adhesion promoter supplied by PPG Industries, Inc. and has the following ingredients:

| | Approximate Weight |
|---|---|
| Deionized water | 75 |
| Acrylic Resin | 10 |
| Urethane resin | 10 |
| N-Methylpyrrolidone | 1 |
| Diethylene Glycol Monohexyl Ether | <1 |
| Ethylene Glycol Monohexyl Etherl | 1 |
| N,N-Dimethyl Ethanolamine | <1 |

"W-260" means "Witcobond W-260" which is a semi-colloidal urethane dispersion supplied by Witco Corporation and which differs substantially from the W-240 colloidal dispersion.

"Sancure 878" is a non-crosslinking polyurethane dispersion different from Witcobond W-240 dispersion and is supplied by Sanncor Industries, Inc., Leominster, Mass.

As Table VI shows, the sheet materials of the invention (Examples 1 and 2) had excellent adhesion of the clearcoat and paint layers to the polyester carrier film which was coated with a thin layer of Witcobond W-240 dispersion. The peel strength for the corona treated sample and for the untreated sample were both much greater than 3000 g per inch of width. Furthermore, the adhesion of the clearcoated sample was much greater than that of the sample which had only a paint layer over the tie coat. Also, the adhesion improved rather than decreased when the clearcoated sample was aged at 38° C. and 100% RH.

In comparison, samples A and B which had no tie coat showed lower adhesion and the adhesion decreased substantially when the samples were aged at 38° C. and 100% RH. The other comparative examples showed poor adhesion after being conditioned.

The invention has been described in detail with particular reference to preferred embodiments thereof, but it will be understood that variations and modifications can be effected within the spirit and scope of the invention.

We claim:

1. A stretchable, thermoformable protective and decorative sheet material for use in a thermoforming process in which it is stretched and bonded to a three dimensional substrate which comprises
a flexible and stretchable, thermoformable polyester carrier film
a polyurethane paint layer formed from a water-based polyurethane paint composition,
a crosslinked polyurethane transparent topcoat, and
disposed between the carrier film and the paint layer, a thin tie layer formed by coating on the carrier film a self-crosslinking aqueous polyurethane anionic colloidal dispersion, the polyurethane being derived from a polyurethane prepolymer of which the chain is extended with an aliphatic polyamine chain extender and is end capped with N-methylol hydrazide groups, the prepolymer being derived from (a) an aliphatic diisocyanate and (b) an aliphatic polyester polyol and having pendant water-dispersing carboxylic salt groups in the polymer chain; said sheet material having a peel strength greater than 3000 g/in after conditioning at 38° C. and 100 percent RH.

2. A sheet material according to claim 1 wherein the carrier film is formed from an immiscible blend of a linear polyester and a more flexible copolymer.

3. The sheet material of claim 2 wherein the linear polyester is a copolymer of terephthalic acid, 1,4-cyclohexanedimethanol and a lower alkylene glycol and the more flexible copolymer is a rubber-modified styrene-maleic anhydride copolymer.

4. The sheet material of claim 1 wherein the aqueous polyurethane dispersion from which the tie layer is formed contains a surfactant.

5. The sheet material of claim 4 wherein the surfactant is a non-ionic fluorinated surfactant.

6. The sheet material of claim 5 wherein the surfactant is of the formula:

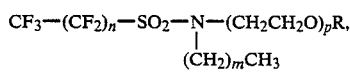

wherein R=H or lower alkyl, m=1 to 4, n=5 to 9 and p=2 to 30.

7. A sheet material according to claim 1 wherein the aliphatic polyester polyol is a derivative of neopentyl glycol, hexanediol and adipic acid and wherein the prepolymer contains units derived from melamine.

8. A sheet material according to claim 7 wherein the aqueous polyurethane dispersion from which the tie layer is formed contains a non-ionic fluorinated surfactant and wherein the thickness of the tie layer after it is dried is less than about 0.0025 mm.

9. A sheet material according to claim 8 wherein the thickness of the tie layer after it is dried is less than about 0.001 mm.

10. A sheet material according to claim 1 wherein the carrier film is a corona discharge treated film.

11. An article comprising a three dimensional substrate having bonded thereto a stretchable, thermoformable protective and decorative sheet material comprising a stretchable thermoformable polyester carrier film, a polyurethane paint layer formed from a water-based polyurethane paint composition, a crosslinked polyurethane paint composition, a crosslinked polyurethane transparent topcoat, and a thin tie layer formed by coating on the carrier film a self-crosslinking aqueous polyurethane anionic colloidal dispersion, the polyurethane being derived from a polyurethane prepolymer of which the chain is extended with an aliphatic polyamine chain extender and is end capped with N-methylol hydrazide groups, the prepolymer being derived from (a) an aliphatic diisocyanate and (b) an aliphatic polyester polyol and having pendant water-dispersing carboxylic salt groups in the polymer chain; said sheet material having a peel strength greater than 3000 g/in after conditioning at 38° C. and 100 percent RH.

* * * * *